United States Patent
Poittevin et al.

(10) Patent No.: US 10,824,112 B2
(45) Date of Patent: Nov. 3, 2020

(54) PROJECTION SYSTEM FOR MEASURING VIBRATIONS

(71) Applicants: UNIVERSITE DU MANS, Le Mans (FR); Centre National de la Recherche Scientifique, Paris (FR); Institut Mines Télécom (IMT) Atlantique Bretagne Pays de la Loire, Brest (FR); Institut de Recherche Technologique Jules Verne, Bouguenais (FR)

(72) Inventors: Julien Poittevin, La Milesse (FR); Pascal Picart, Le Mans (FR); Kevin Heggarty, Lanrivoare (FR); Julien Le Meur, Plouzane (FR)

(73) Assignees: UNIVERSITE DU MANS, Le Mans (FR); CENTRE NATIONAL DE LA RECHERCHE SCIENTIFIQUE, Paris (FR); INSTITUT MINES TÉLÉCOM (IMT) ATLANTIQUE BRETAGNE PAYS DE LA LOIRE, Brest (FR); INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 0 days.

(21) Appl. No.: 16/496,889

(22) PCT Filed: Mar. 19, 2018

(86) PCT No.: PCT/FR2018/050658
§ 371 (c)(1),
(2) Date: Sep. 23, 2019

(87) PCT Pub. No.: WO2018/172681
PCT Pub. Date: Sep. 27, 2018

(65) Prior Publication Data
US 2020/0089164 A1    Mar. 19, 2020

(30) Foreign Application Priority Data

Mar. 24, 2017    (FR) .................................... 17 00316

(51) Int. Cl.
*G01H 9/00* (2006.01)
*G03H 1/04* (2006.01)
*G03H 1/00* (2006.01)

(52) U.S. Cl.
CPC ............. *G03H 1/0005* (2013.01); *G01H 9/00* (2013.01); *G03H 1/0402* (2013.01);
(Continued)

(58) Field of Classification Search
CPC ............... G03H 1/0005; G03H 1/0443; G03H 2001/0033; G03H 2001/0436; G01H 9/00
See application file for complete search history.

(56) References Cited

U.S. PATENT DOCUMENTS

2005/0237533 A1* 10/2005 Lal ........................... G01H 9/00
356/486
2006/0262319 A1* 11/2006 Gatt ......................... G01H 9/00
356/492

(Continued)

OTHER PUBLICATIONS

International Search Report and Written Opinion for PCT Patent App. No. PCT/FR2018/050658 dated Jun. 18, 2018.

(Continued)

*Primary Examiner* — Jonathan M Hansen
(74) *Attorney, Agent, or Firm* — Kenealy Vaidya LLP

(57) ABSTRACT

Some embodiments are directed to a system for measuring vibrations of a surface of a mechanical part, by digital holography. The system includes a source of radiation emitting in a predetermined range of frequencies, a first separator element configured to define a first incident ray and a reference ray, a module for shaping a second incident ray from the first incident ray, and an optical element (Continued)

configured to make the reference ray and a radiation produced by a reflection of the incident ray on the surface of the mechanical part interfere. The module for shaping the second incident ray includes diffracting optical elements having a diffraction structure to diffract the incident radiation. The structure is from a polymer, sol-gel or photoresin material resting against a glass substrate, the structure including elements etched in a plane parallel and/or orthogonal to the substrate, with dimensions from 100 nanometres to 100 micrometres.

1 Claim, 2 Drawing Sheets

(52) U.S. Cl.
CPC ... *G03H 1/0443* (2013.01); *G03H 2001/0033* (2013.01); *G03H 2001/0436* (2013.01); *G03H 2223/23* (2013.01)

(56) References Cited

U.S. PATENT DOCUMENTS

| 2008/0144041 | A1* | 6/2008 | Muenter | G01B 9/02003 |
| | | | | 356/484 |
| 2010/0281986 | A1 | 11/2010 | Toal et al. | |
| 2014/0320865 | A1 | 10/2014 | Knuttel | |
| 2015/0300803 | A1 | 10/2015 | Horimai et al. | |

OTHER PUBLICATIONS

Ferstl, M., et al., "Theoretical and Experimental Properties of a Binary Linear Beam-Splitting Element With a Large Fan Angle," Journal of Modern Op 2004;51(14):2125-2139.

Poittevin, J., et al., "Multi-point vibrometer based on high-speed digital in-line holography," Appl. Opt. 2015;54:3185-3196.

Search Report from French Priority Patent App. No. 1700316 dated Feb. 13, 2018.

* cited by examiner

PROJECTION SYSTEM FOR MEASURING VIBRATIONS

CROSS REFERENCE TO RELATED APPLICATIONS

This application is a national phase filing under 35 C.F.R. § 371 of and claims priority to PCT Patent Application No. PCT/FR2018/050658, filed on Mar. 19, 2018, which claims the priority benefit under 35 U.S.C. § 119 of French Patent Application No. 1700316, filed on Mar. 24, 2017, the contents of each of which are hereby incorporated in their entireties by reference.

BACKGROUND

The presently disclosed subject matter relates to a system for measuring vibrations of a mechanical element. The presently disclosed subject matter relates more particularly to a device or equipment of the holographic torch type suitable for a rapid measurement of parts with varied shapes and dimensions.

Vibrations of structures are conventionally studied or measured using accelerometer devices or vibration-measuring devices with radiation emissions such as lasers.

These techniques that have become conventional provide punctiform measurements, namely measurements representing the vibration of a structure at a particular target point on the structure.

Accelerometer devices are moreover intrusive systems in that they may require being integrated in or coupled to the structure the vibrations of which are being measured.

In the field of studying vibrations of mechanical structures, it may be important to obtain a mapping of the spatial variations in the vibratory field, in amplitude and phase, which possibly requires scanning a surface of the structure rather than solely one or more points in particular.

Digital optical holography techniques now allow contactless measurement of a vibratory field of a mechanical structure and find many applications, such as, by way of example, measuring the vibratory response of a human eardrum, or measuring the vibratory response of a loudspeaker, or of vibrating plates. It is then possible to analyse the vibration modes of these structures.

Characterising structures under real operating conditions possibly requires analysis in the time domain. The vibrations of panels caused by hydroelastoacoustic phenomena, by grating and rubbing, constitute typical examples of situations that cannot be studied by a stationary approach.

The available performances of current laser devices and CMOS sensors now offer possibilities of obtaining spatiotemporal information representing the structures being studied.

The document entitled "Multi-point vibrometer based on high-speed digital in-line holography" (Poittevin, Picart, Faure, Gautier and Pezerat; Appl. Opt. 54, 3185-3196, 2015) describes a digital optical holography system based on a principle of coherent light wave interferences. The method described in this document allows measurement of the vibratory field of a structure with high spatial resolution. The study of non-stationary phenomena is described therein by the use of a fast camera.

This digital optical holography system can however be improved.

SUMMARY

The presently disclosed subject matter makes it possible to improve at least some of the drawbacks of the related art by proposing a system for measuring vibrations of a surface of a mechanical part by digital holography, including a radiation source emitting in a predetermined range of frequencies, a first separator element configured to define a first incident ray and a reference ray, a module for shaping a second incident ray from the first incident ray, and an optical element configured to make the reference ray and radiation produced by a reflection of the second incident ray on the surface of the mechanical part being analysed interfere, the system according to the presently disclosed subject matter being characterised in that the module for shaping the second incident ray includes one or more diffracting optical elements, each including at least one diffraction structure configured to diffract all or part of the second incident radiation intended to illuminate the mechanical part being studied.

The diffracting optical elements are optical elements including at least one diffracting structure.

According to one embodiment of the presently disclosed subject matter, the separator element is a polarisation separation element.

According to one embodiment of the presently disclosed subject matter, the diffracting structure, also referred to as a diffraction structure, is produced in a glass substrate.

According to a variant of the embodiment, the diffraction structure is produced from shapable matter (a material) resting against a glass substrate.

Advantageously, the shapable matter is polymer or sol-gel material or a photoresin.

According to one embodiment of the presently disclosed subject matter, dimensions of elements produced (for example etched, printed or shaped) in a plane defined parallel to the substrate and constituting the diffracting structure lie in a range from 100 nanometres to 100 micrometres.

In one embodiment of the presently disclosed subject matter, dimensions of elements produced (for example etched, printed or shaped) in a plane defined orthogonally to the substrate and constituting the diffracting structure lie in a range from 100 nanometres or 100 micrometres.

The term "diffracting structure" must or should be interpreted as a structure, microstructure or nanostructure etched, printed or shaped in a simple or compound material and effecting diffraction of a ray or beam passing through this structure.

The presently disclosed subject matter further relates to a holographic projector device including a measuring system as previously described, as well as a fast camera, and for which one of the diffracting optical elements can be selected manually by a user or automatically so as to adapt the shaping of the second incident ray according to the shape of the surface of the mechanical part the vibration profile of which is to be analysed.

BRIEF DESCRIPTION OF THE FIGURES

The presently disclosed subject matter will be better understood, and other particularities and advantages will emerge from a reading of the following description, the description referring to the accompanying drawings, among which.

DETAILED DESCRIPTION OF EXEMPLARY EMBODIMENTS

In FIGS. 1 to 5, the modules depicted are functional units that correspond or not to physically distinguishable units. For example, these modules or some of them are grouped together in a single component, or include functionalities of the same software. On the other hand, according to other embodiments, some modules are composed of separate physical entities.

Figure 1:
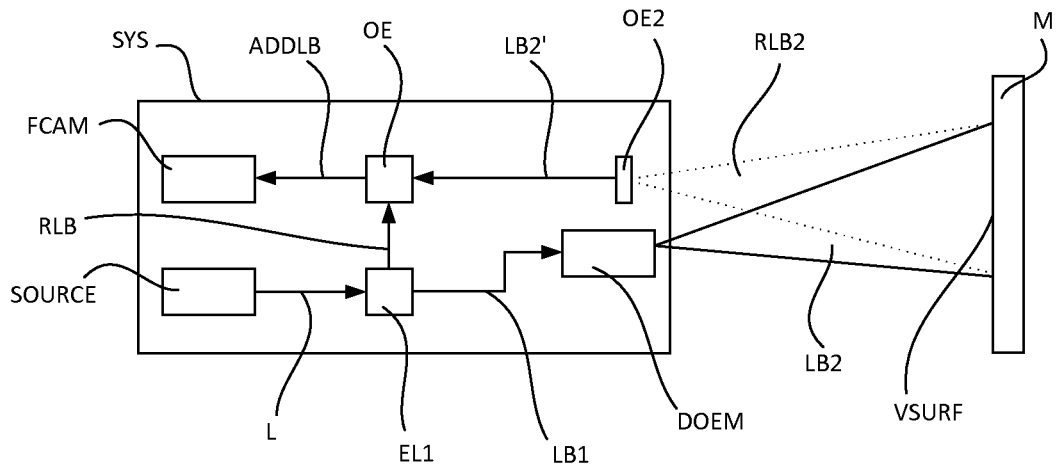
FIG. 1 is an outline diagram of a vibration measuring system according to a particular and non-limitative embodiment of the presently disclosed subject matter.

FIG. 1 is an outline diagram of a vibration measuring system SYS according to a particular and non-limitative embodiment of the presently disclosed subject matter.

The vibration measuring system SYS is suitable for measuring vibrations of a surface VSURF of a mechanical part M, in an industrial environment for example. The system SYS includes a source SOURCE of radiation L emitting in a predetermined frequency range LF.

According to the preferred embodiment of the presently disclosed subject matter, the source SOURCE emits radiation of the laser type and the frequency range LF corresponds to the one traditionally used for a power laser. The system SYS includes a first separator element EL1 configured to define a first incident ray LB1 and a reference ray RLB from the radiation (also referred to as ray or beam) L emitted by the source SOURCE. The system also includes a module DOEM for shaping a second incident ray LB2 from the first incident ray LB1 available at the output of the separator element EL1. The system SYS further includes an optical element OE suitable for producing an addition ADDLB of the reference ray RLB available at the output of the element EL1 and of a radiation LB2' representing a reflection RLB2 of the second incident ray LB2 on the surface VSURF of the mechanical part M.

Advantageously, the module DOEM for shaping the second incident ray LB2 includes one or more (n) diffracting optical elements DOE1, . . . , DOEn, which each (or some of them) include at least one diffraction structure FSTRUCT configured to diffract all or part of the first incident radiation LB1. It is thus cleverly made possible to use a single and same item of equipment including the system SYS described previously for the purpose of analysing the vibration modes of a surface VSURF of a mechanical part M. Advantageously, this makes it possible to optimise the measurement according to the shape and size of the part M.

The term "mechanical part" means here any material or organic element, isolated or part of a system, including a simple material or a compound material, and which, subjected to one or more stresses, vibrates according to these stresses and its own characteristics.

Advantageously, the module DOEM for shaping the incident laser ray LB2 makes it possible to illuminate a vibrating surface VSURF with varied shapes and dimensions.

Cleverly, the shaping module DOEM includes a plurality of n diffracting optical elements DOE1 to DOEn, assembled on a single movable element having a plane perpendicular to the incident laser ray LB1, so as to insert any of the diffracting elements DOE1 to DOEn in the beam LB1 according to the surface to be analysed.

According to one embodiment of the presently disclosed subject matter, each of these diffracting elements DOE1 to DOEn includes a diffracting structure different from the structure of the other diffracting elements DOE1 to DOEn, so as to allow a multiplicity of shapings of the incident ray (beam) LB2 configured to illuminate a vibrating surface VSURF of the mechanical part M.

Advantageously, the diffracting elements are assembled on a rotary disc centred on an axis A2 (depicted in FIG. 2), wherein one or more peripheral or concentric zones of the disc carry the diffracting elements DOE1 to DOEn. The rotary disc is configured to rotate about the axis A2 and can be locked manually by a user or automatically according to an instruction from a user, so as to maintain, in the beam LB1, a selected diffracting structure FSTRUCT and thus to form a beam LB2 according to characteristics of the part M being subjected to a vibration analysis.

Advantageously, the whole of the system SYS is included in a portable item of equipment or device EQU1 (depicted in FIG. 3) thus constituting a movable (portable) holographic torch suitable for simplifying vibration measuring operations in industrial environments, for example, and configured to target parts with varied shapes and dimensions and thus to carry out analyses of vibrations using a digital optical holographic method.

Figure 2:
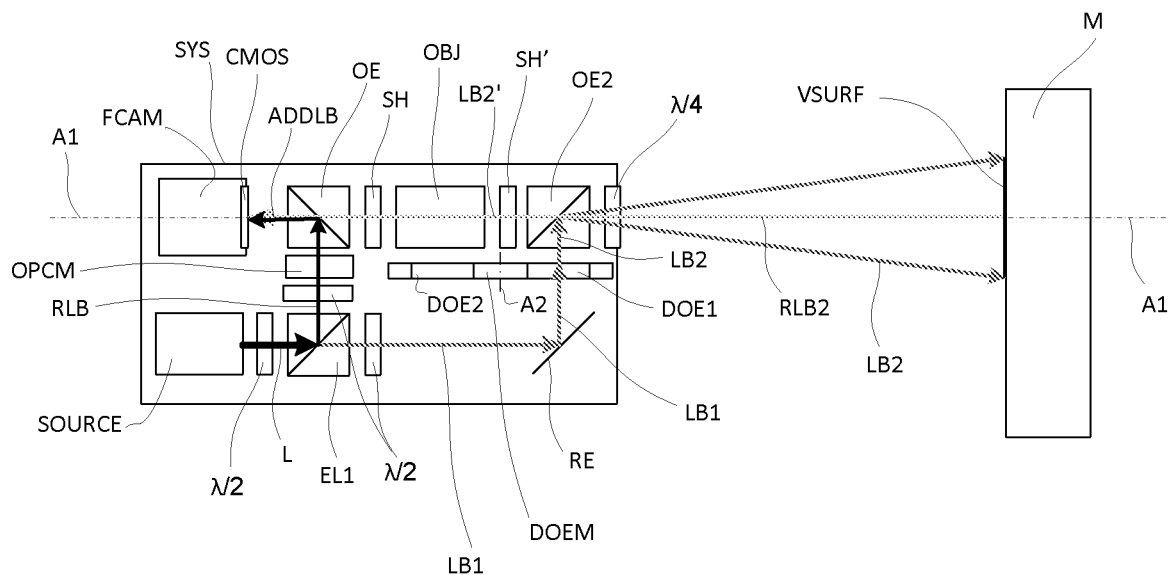
FIG. 2 shows details of implementation of the system already shown in FIG. 1.

FIG. 2 shows details of implementation of the system SYS according to the presently disclosed subject matter, already depicted in FIG. 1. The elements described in this figure illustrate a detailed embodiment of the multipoint vibrometry principle used on the basis of an approach by ultrafast digital holography. The embedded camera FCAM of the system SYS is suitable for capturing signals ADDLB resulting from the addition of the reference ray (beam) RLB and from the image LB2' representative of the beam LB2 reflected by the analysed surface VSURF of the mechanical part M.

Advantageously, an equipment EQU1 including the system SYS according to the presently disclosed subject matter allows acquisition, in a single full-field measurement and without requiring any contact with mechanical part M, of the vibration field of the vibrating surface VSURF. By virtue of the clever shaping of the first incident ray LB1 into a second incident ray LB2 by the shaping module DOEM, the second incident beam (ray) LB2 is configured to illuminate a vibrating surface VSURF that may be as much as several tens of cm$^2$.

Thus a movable item of equipment (device) EQU1, which is portable, based on optical interferometry according to the presently disclosed subject matter, has been able to be designed by the inventors. The equipment EQU1 depicted in FIG. 3 includes, apart from the system SYS according to the presently disclosed subject matter described above, all the structural elements useful for use thereof. The source of radiation SOURCE of the vibrometer equipment EQU1 of the movable holographic torch type is a power laser. The camera FCAM used includes an ultrafast CMOS sensor. The system SYS includes a plurality of optomechanical elements, such as lenses, waveplates ($\lambda/2$ and $\lambda/4$) and reflective mirrors (RE in FIG. 2, for example). The principle implemented in the equipment EQU1 designed includes making the two coherent optical beams RLB and LB2' (which are summed as a beam ADDLB) interfere in the plane of the camera FCAM. Thus the reference beam (or ray) RLB directly illuminates the CMOS sensor of the camera FCAM after having been treated by an operation (in particular by the element OPCM) aiming at forming a wave the wave front of which is controlled, and interferes with the so-called "object" beam LB2' representative of the image returned by the beam LB2 shaped by the shaping module DOEM.

Advantageously, such equipment EQU1 can be used by an operator not specialising in vibration analysis since the interferometry measurement used makes it possible, on the basis of an analysis of the signals delivered by the CMOS sensor of the camera FCAM, to quantify the vibration profile of the surface VSURF of the mechanical part M "illuminated" by the shaped beam LB2.

It must or should be understood here that "illumination" of the surface VSURF means the projection of the shaped incident beam LB2 onto a vibrating surface VSURF of the mechanical part M.

Cleverly, the quality of the illumination obtained by shaping of the incident beam LB2 suited to the shape and dimensions of the surface VSURF allows a reduction in the power of the laser beam while keeping a sufficient level of illumination of the CMOS sensor of the camera FCAM. This advantageously makes it possible to use a laser source SOURCE compatible with constraints inherent in the safety of the users of the movable holographic torch equipment designed and subjects liable to be illuminated by the incident beam LB2.

The use of the system SYS implemented makes it possible to have a novel tool for measuring structure vibrations in particular because of a structured shaped illumination in the axis A1 of the ultrafast camera FCAM by the module DOEM for shaping the incident beam LB2.

The illumination controlled by the beam LB2 makes it possible to dispense with spatial filtering in the Fourier domain, in the process of calculating the vibratory field by reconstruction of the optical phase.

The diversity of the diffracting elements DOE1 to DOEn including nanostructures or microstructures offers an operator (a user) the ability to form the illuminating beam LB2 according to a plurality of geometric shapes. A divergent lens OBJ is used for controlling the distance between the virtual object including the reflected image of the surface VSURF (that is to say the reflection of LB2 on the surface VSURF) seen by the optical element OE2 of FIG. 1.

Advantageously, the etchings carried out in a plane orthogonal to the plane of the substrate for a diffracting structure of a diffracting element DOEn makes it possible to optimise the energy efficiency of the diffracting element DOEn in question for a predefined wavelength of the incident beam LB2.

The typical diffraction efficacy of the diffracting elements DOEn of the module DOEM is around 80%. Typical diffraction efficacy should be taken to mean the proportion of incident radiation on the diffracting element DOEn used that is found in the light distribution illuminating the surface VSURF being analysed.

The diffracting structures produced on the substrate of a diffracting element or on a shapable material resting against a substrate may have various profiles. These diffracting structures FSTRUCT may have a binary profile, that is to say one including one level of etching, or a profile with a plurality of discrete etching levels. The diffracting structures may also be produced by an etching operation with a continuous profile in the shaped material.

It should be noted that the term "etching" means here the production of a structure element by any operation of etching, writing, printing or fashioning of the material being shaped.

The total diffracting surface of a diffracting element DOE is suited to the form of the illuminating beam sought. Such a surface lies between a few $mm^2$ and a few $cm^2$, and advantageously larger than the incident beam LB1.

The diffracting structures used are for example produced by the implementation of photolithography methods using successive operations of direct masking and writing by laser beam or by electron beam. The mass production of such diffracting elements sometimes has recourse to duplication techniques using a so-called "master" element. These duplication techniques are for example ultraviolet radiation moulding, hot embossing or injection moulding.

The maximum diffraction angle of a diffracting element DOEn varies according to the minimum dimensions of the nanostructures or microstructures that it includes. The maximum angle is typically 50°.

A diffracting element DOEn according to the presently disclosed subject matter may be designed to operate in Fourier diffraction mode or in Fresnel mode, in which case the required image is formed in a plane chosen behind the diffracting element.

According to a preferred embodiment of the presently disclosed subject matter, a plurality of diffracting elements DOEn of the shaping module DOEM are arranged, in a circular or semi-circular fashion for example, on an element mounted for rotation about an axis A2, so that the rotation of this element allows the presentation of a diffracting element chosen from the plurality of diffracting elements available facing the first incident beam (ray) LB1 in order to form the second incident beam LB2 according to the form of a targeted vibrating surface and/or the dimensions thereof.

Cleverly, such an assembly of various diffracting elements DOEn allows illumination of a vibrating surface VSURF being studied with a light beam formed, with a uniform beam intensity and a variance as low as possible. The residual central spot (said to be "of zero order" and corresponding to the part of the incident light not diffracted by the diffracting element DOEn) typically contains less than 4% of the energy of the incident beam applied to the diffracting element DOEn.

The system SYS further includes a divergent objective OBJ composed of a plurality of optical lenses, the combination of which makes it possible to obtain a system with a negative focal length. This objective allows the production of a so-called "virtual" image of the object plane at a predetermined distance of the CMOS sensor from the camera FCAM, so that the holographic device overall operates in a Fresnel configuration. Thus the image produced by the divergent objective used is created at a distance that responds to the sampling constraints by the CMOS sensor of the camera FCAM.

According to the preferred embodiment of the presently disclosed subject matter, the vibrating surface VSURF of a mechanical part M is situated at approximately two metres from the capture plane of the CMOS sensor of the camera FCAM. However, and through the divergent objective, the structure appears closer and smaller, which tends to virtually reduce the size of the image obtained of the surface VSURF.

The system SYS includes an optical phase control module OPCM suitable for forming a wave front, the phase and amplitude of which are perfectly controlled. According to one embodiment of the presently disclosed subject matter, this module includes a microscope characterised by a magnification factor of 40, a microscope hole with a dimension of 10 to 15 micrometres and a collimation lens.

According to a variant, this module may be a diffracting optical element DOE' configured to produce a divergent light beam and the phase distribution of which applied to the plane of the CMOS sensor of the camera FAM can be determined.

The module DOEM for shaping the first beam LB1 into a second beam LB2 includes, apart from the rotary arrangement of diffracting elements DOEn, a separator element OE2 and a quarter-wave plate referred to as "λ/4". Illumination of the surface VSURF being analysed is made possible in the axis of the camera by a separator element that reflects the totality of the beam LB2 at the output of the diffracting element DOEn selected, polarised vertically. The beam thus formed passes through a plate element referred to as "λ/4" in order to obtain a circular polarisation. The beam reflected by the surface VSURF thus illuminated is next polarised horizontally after having once again passed through the plate element referred to as "λ/4", which enables it to entirely pass through the separator element OE2.

The matrix of the CMOS sensor of the ultrafast camera FCAM receives signals representing the coherent summation ADDLB of the reference ray LRB and of the beam LB2' coming from the surface VSURF being analysed and the camera operates as a digital recorder of a digital hologram that allows use of the Fresnel transform at the distance between the image of the surface VSURF and the CMOS sensor of the camera FCAM. This use by calculation allows the delivery of a complex optical field, one phase of which is extracted. This phase thus extracted constitutes information representative ofthe movement fields of the surface VSURF of the mechanical part M, and observing its change over time affords a full-field and contactless vibration analysis of at least a portion of the mechanical part M being analysed.

According to a variant of the embodiment of the presently disclosed subject matter, the diffracting elements DOEn are not included in a rotary element but are arranged alone or combined on supports to be inserted in a dedicated housing of the holographic torch equipment EQU1 so that a user can choose which diffracting element DOEn is to be inserted in the radiation beam LB1 of the equipment EQU1 for the purpose of shaping the beam LB2 to illuminate a vibrating surface VSURF of a distant mechanical part M.

The elements SH and SH' depicted in FIG. 2 are mechanical obturators.

All the other elements that can be used are not described further since they are not useful to an understanding of the presently disclosed subject matter for a person skilled in the art. These non-described elements are by way of example the control unit of the camera, the electrical supply systems, the mechanical systems for packaging and arranging the various elements, the details of the laser source SOURCE, etc.

Figure 3:
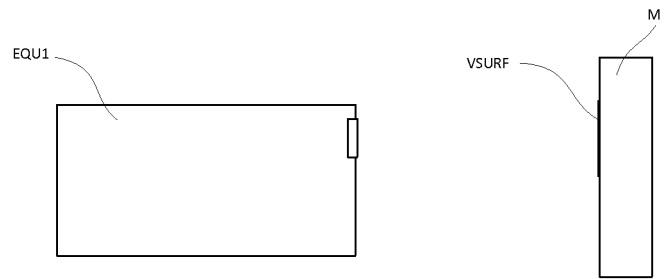
FIG. 3 shows metrology equipment embedding a system SYS according to the presently disclosed subject matter.

FIG. 3 depicts movable (portable) equipment EQU1 suitable for a contactless holographic vibration measurement of any vibrating surface VSURF of a distant part M.

Figure 4:
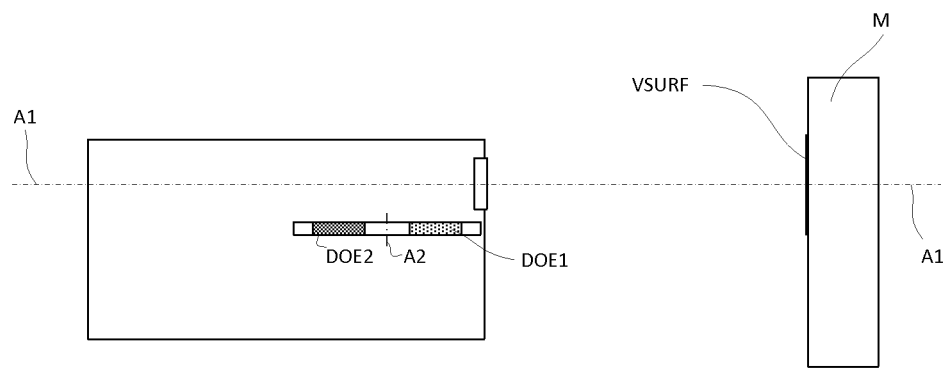
FIG. 4 shows details of implementation of the ray or beam shaping module used in the system SYS, FIG. 5 describes more particularly the members for shaping the incident beam of the system SYS.

FIG. 4 depicts essential elements of the module for shaping the incident beam LB2, and in particular a rotary disc articulated about an axis A2 and including a plurality of diffracting elements DOEn (DOE1 and DOE2 are depicted in the figure) configured to insert any of the diffracting elements available in the incident beam LB1. Advantageously, each of the diffracting elements includes a diffracting structure different from that of the other diffracting elements.

Figure 5:
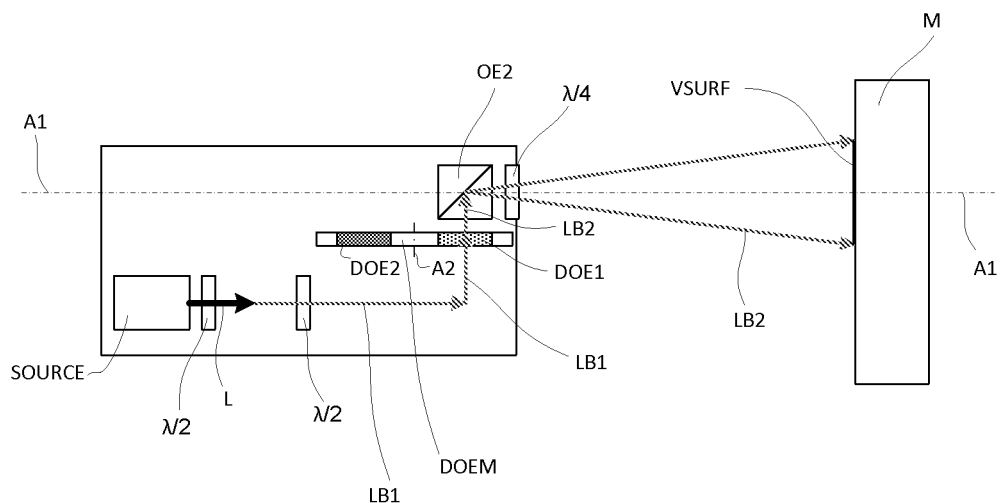

FIG. 5 depicts essential elements of the system SYS participating in the shaping of the incident beam LB2 with a view to illuminating a vibrating surface VSURF of a distant part M.

The diffracting element DOE1, having a diffracting structure that is particular to it, is inserted in the first incident ray LB1 for the purpose of carrying out a diffraction suitable for creating the second incident beam LB2, which is suitable for a vibration measurement on the surface VSURF.

Advantageously, the variety of the diffracting elements DOE1 to DOEn makes it possible to create illumination surfaces with rectangular, square, triangular, oval, circular or trapezoidal shapes or any other shape.

The methods used in equipment tested make it possible to achieve illumination surfaces wherein the largest overall dimension is around 30 cm with a laser source SOURCE emitting at a wavelength of 532 nm and a beam diameter L of 2 mm.

The presently disclosed subject matter is not limited solely to the embodiment described but to any system for measuring vibrations of a distant surface including a radiation source, a separation element configured to define a first incident ray and a reference ray, a module for shaping a second incident ray from the first incident ray and optical equipment suitable for a summation of the reference ray and radiation produced by a reflection of the second incident ray on the surface being studied, the system further including a module for shaping the second incident ray, the shaping module including one or more selectable diffracting optical elements each including a diffraction structure configured to diffract all or part of the second incident radiation according to the form of the surface being studied.

The invention claimed is:

1. A system for measuring vibrations of a surface of a mechanical part, by digital holography, the system comprising: a source of radiation emitting in a predetermined range of frequencies;
a first separator element configured to define a first incident ray and a reference ray;
a shaping module configured to produce a second incident ray from the first incident ray;
an optical element configured to make the reference ray and a radiation produced by a reflection of the second incident ray on the surface of the mechanical part interfere;
a camera configured to record a digital hologram in the form of the coherent summation of the reference ray and the radiation produced by said the reflection, wherein
the shaping module includes one or more diffracting optical elements, each having at least one diffraction structure configured to diffract all or part of the first incident ray,
the system being characterised in that the at least one diffraction structure is produced from a polymer, sol-gel or photoresin material resting against a glass substrate, the structure including elements etched in a plane parallel and/or orthogonal to the glass substrate, the elements having dimensions ranging from 100 nanometres to 100 micrometres.

* * * * *